United States Patent [19]

Czerniejewski

[11] 3,932,885

[45] Jan. 13, 1976

[54] SYSTEM AND METHOD FOR XENON ACCELERATION IN TRAINING SIMULATOR FOR NUCLEAR POWER PLANT

[75] Inventor: Francis R. Czerniejewski, Glenshaw, Pa.

[73] Assignee: Westinghouse Electric Corporation, Pittsburgh, Pa.

[22] Filed: Feb. 23, 1973

[21] Appl. No.: 335,287

[52] U.S. Cl. .......................... 444/1; 176/19; 35/13
[51] Int. Cl. ..... G06f 15/06; G06f 15/56; G06b 9/00
[58] Field of Search ........... 444/1; 235/184; 176/19, 176/24; 35/10, 13, 10.2

[56] References Cited
UNITED STATES PATENTS

| | | | |
|---|---|---|---|
| 3,061,945 | 11/1962 | Hawkins | 35/10 |
| 3,237,318 | 3/1966 | Schager | 35/10 |

OTHER PUBLICATIONS

Reactor Simulator Utilizing a Vacuum System; Harry Reese, Jr.; RCA Technical Notes, RCA TN No.: 493, Sept. 1961.

Dynamic Simulation of a Fast Reactor; R. G. Olson, Nucleonics, May, 1957; pp. 76–79.

An Electronic Reactor Simulator; Ross Cameron & D. A. Austio; Nuclear Power; Apr., 1957; pp. 146–151.

PWR Training Simulator; J. P. Franz & W. H. Alliston; Nucleonics, May, 1957; pp. 80–83.

*Primary Examiner*—Malcolm A. Morrison
*Assistant Examiner*—Edward J. Wise
*Attorney, Agent, or Firm*—H. W. Patterson

[57] ABSTRACT

A method and system for the real-time dynamic simulation of a nuclear power plant that includes a control and monitoring console for operating the reactor and monitoring three dimensional physical values, such as nuclear flux, power and temperature throughout the core. A digital computer is connected to the console to calculate the physical values in real-time, with such calculations including the effect of xenon on the output and distribution of the power in the core. The method and system also provides for accelerating the xenon effect to provide for accurate simulation in real-time without the necessity of operating the simulator continuously through the preselected time span.

15 Claims, 9 Drawing Figures

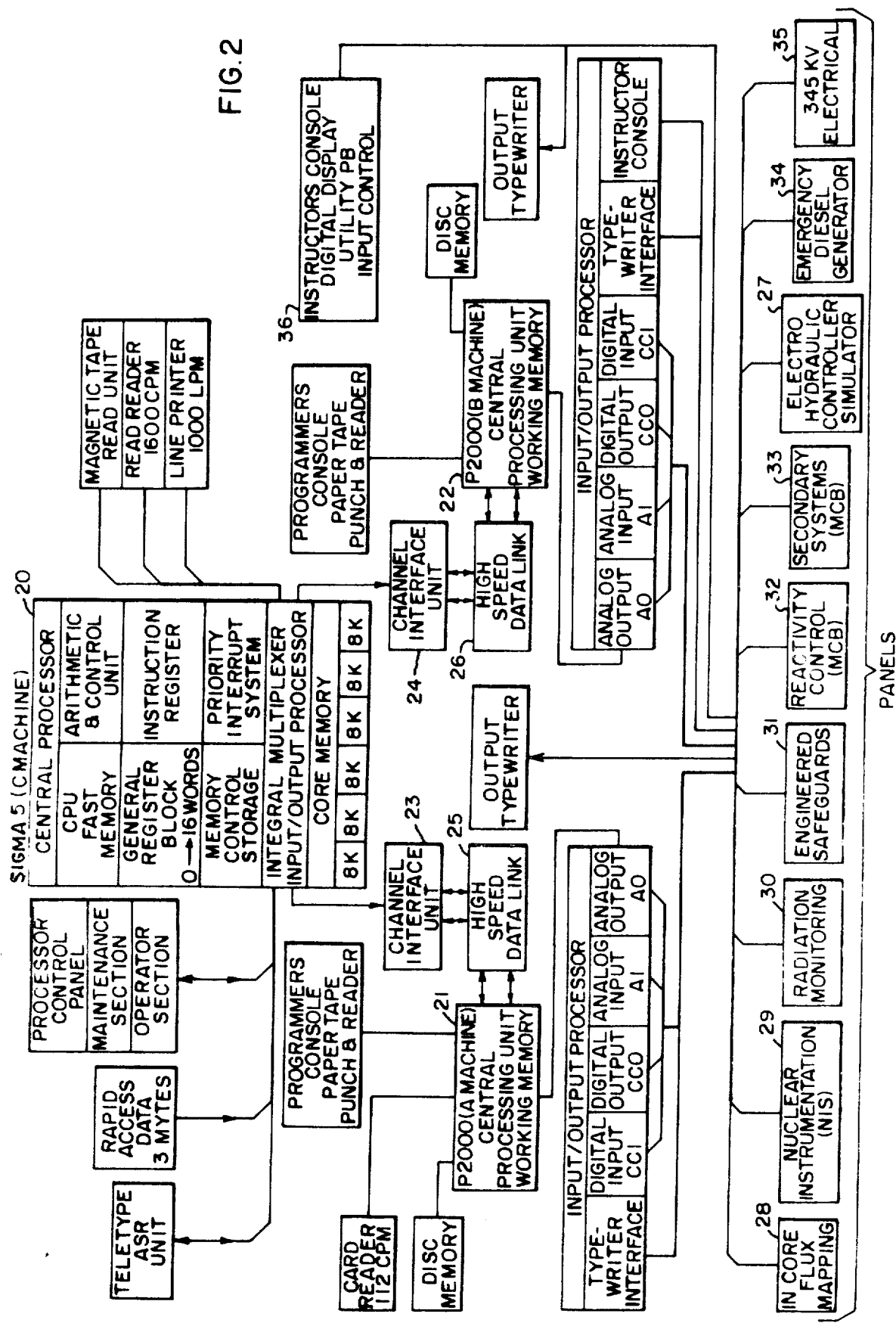

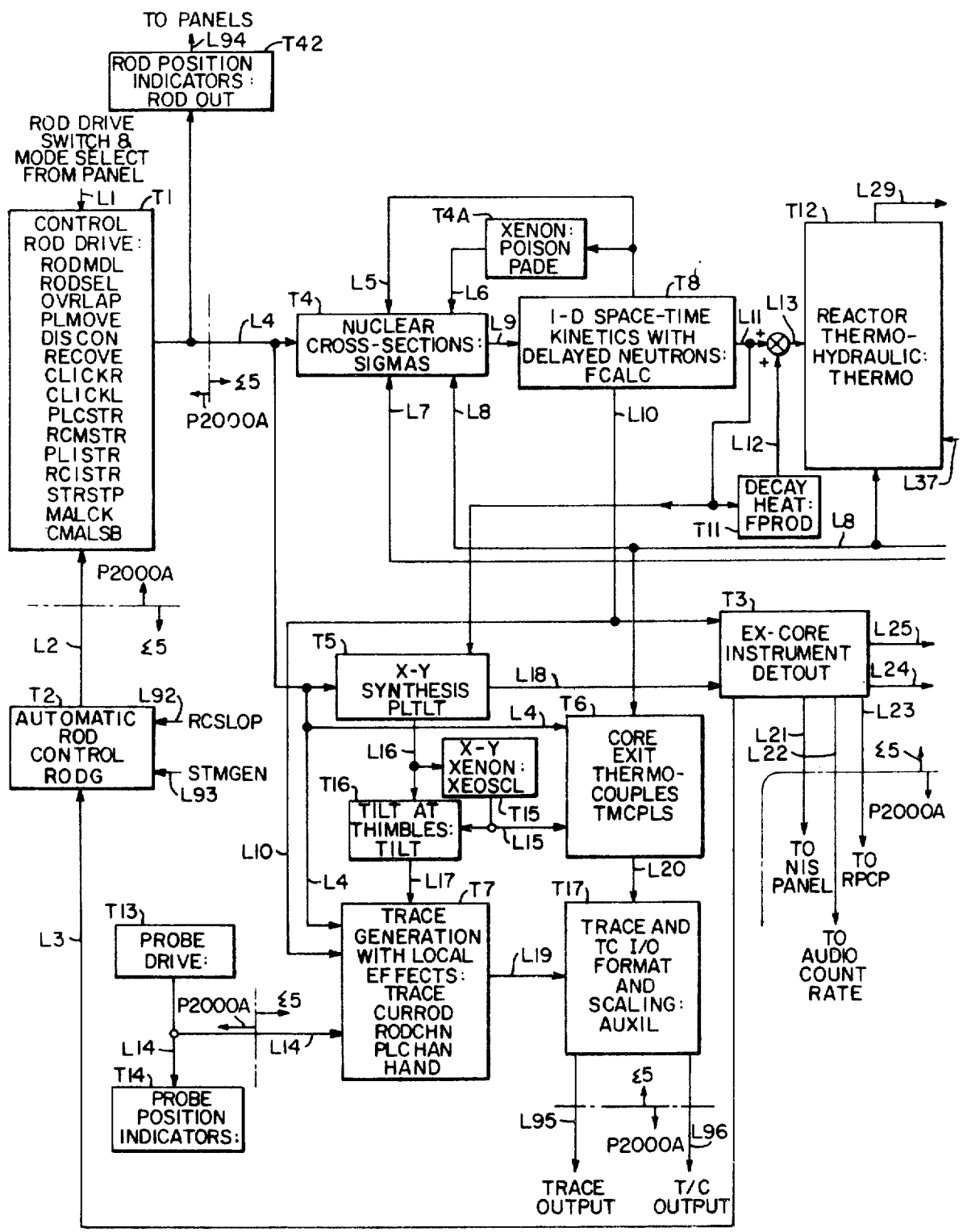
FIG.95/1A

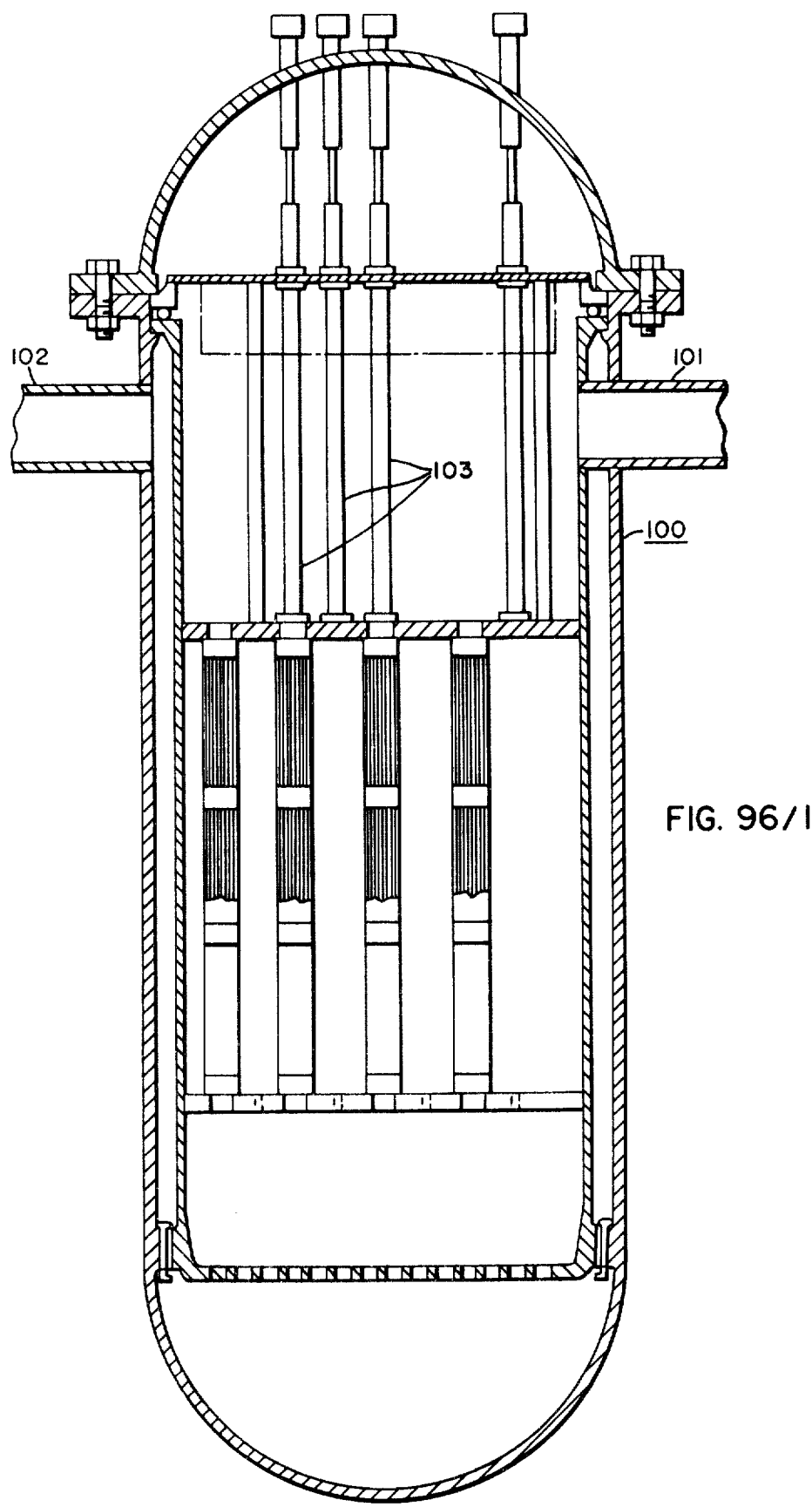
FIG. 96/1

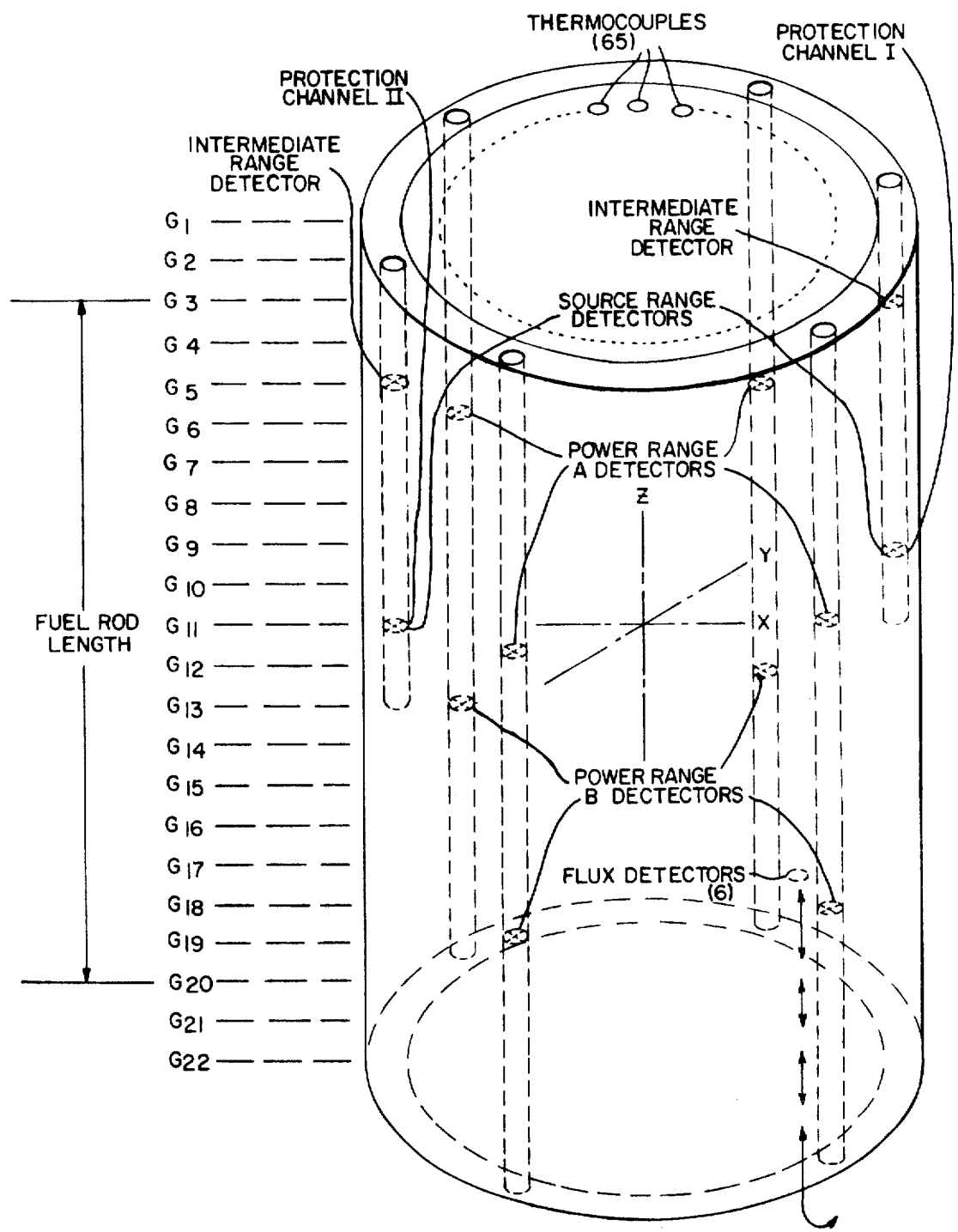
FIG.96/2

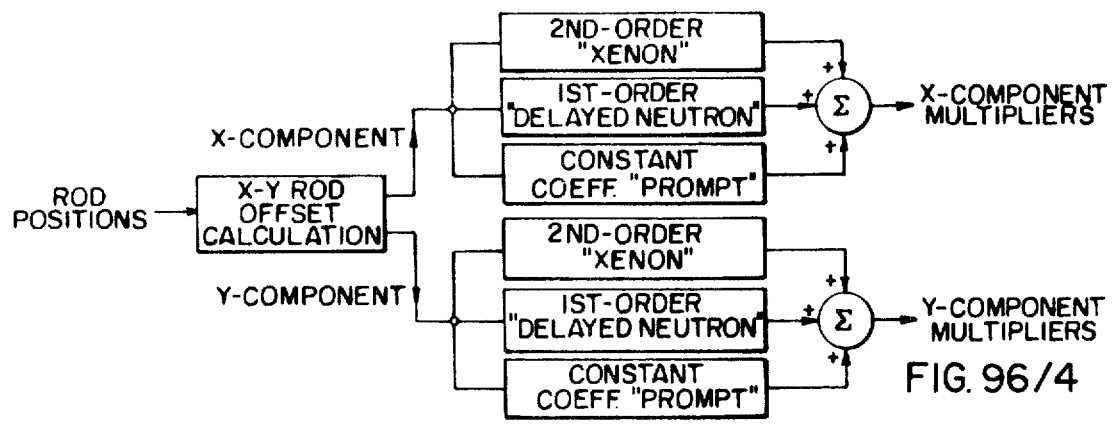
FIG. 96/4
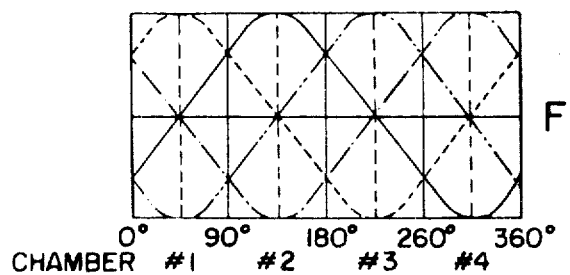
CHAMBER  #1  #2  #3  #4
FIG. 96/5
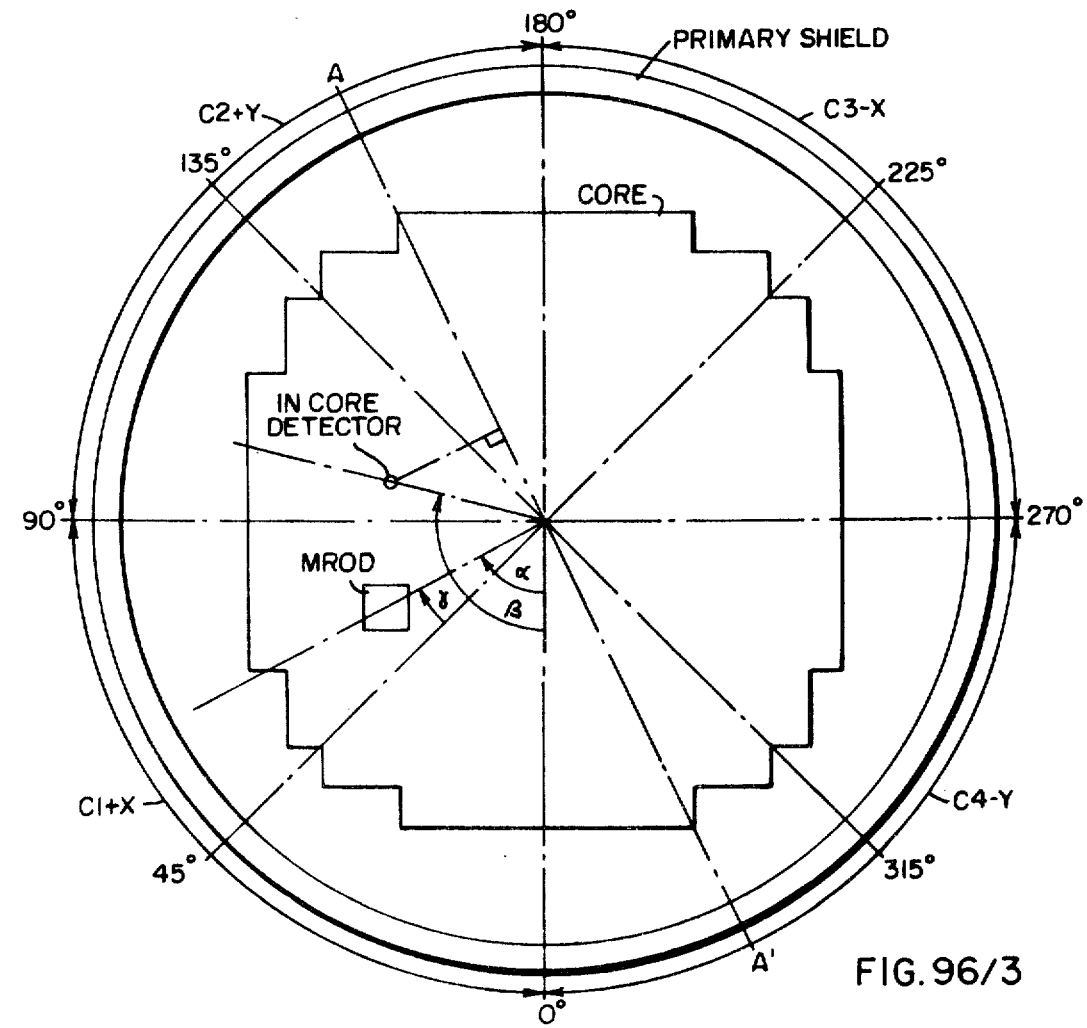
FIG. 96/3

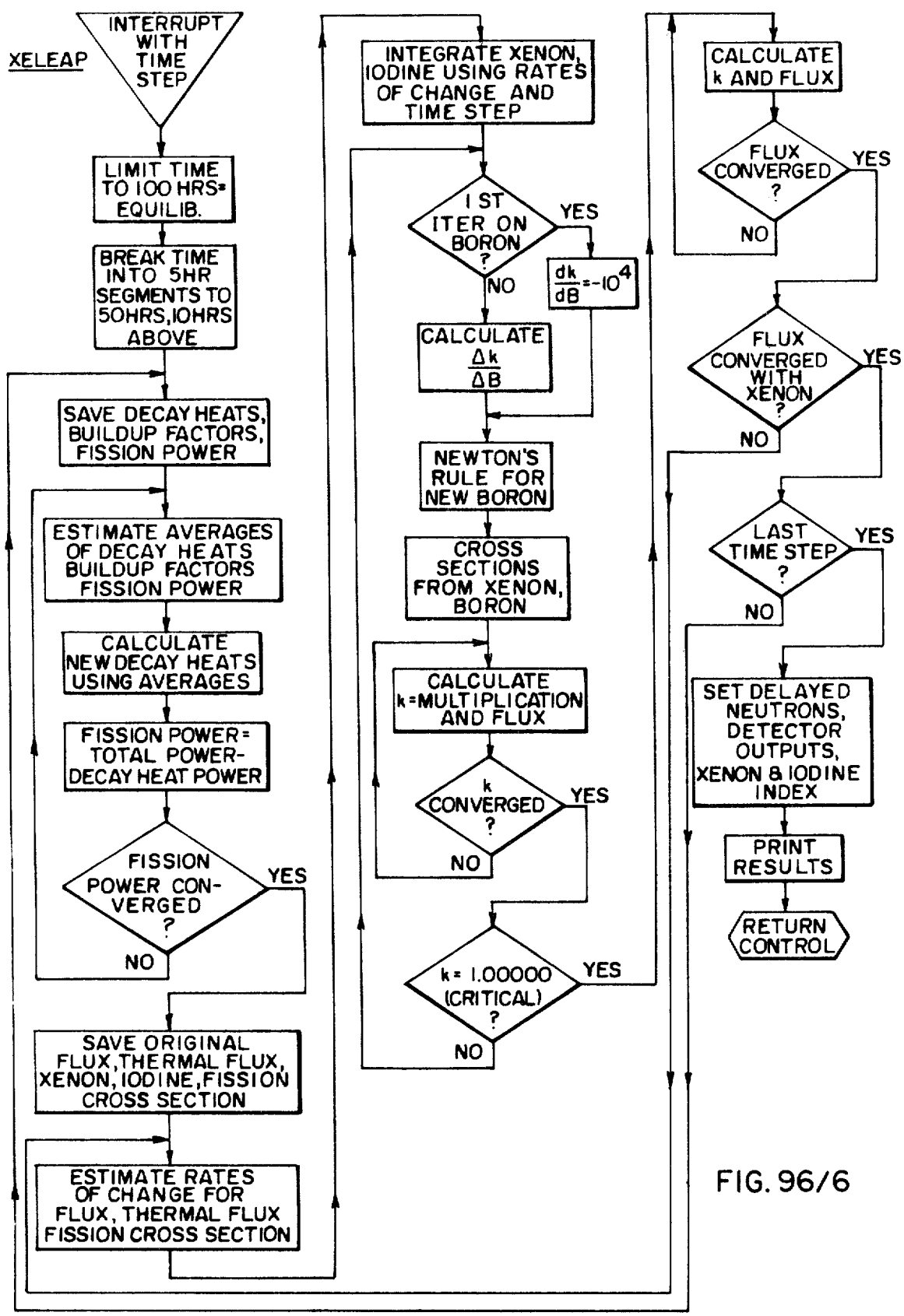
FIG. 96/6

SYSTEM AND METHOD FOR XENON ACCELERATION IN TRAINING SIMULATOR FOR NUCLEAR POWER PLANT

CROSS REFERENCE TO RELATED APPLICATIONS

Reference is made to the following concurrently filed and related patent applications which are assigned to the present assignee:

1. Ser. No. 333,901 entitled "Training Simulator For A Nuclear Power Plant" and filed by G. L. Gregg, R. E. Putman and J. W. Gomola on Feb. 23, 1973 in U.S. Patent Office.
2. Ser. No. 335,286 entitled "Nuclear Power Plant Training Simulator System And Method" and filed by R. W. Ferguson and R. E. Converse on Feb. 23, 1973 in U.S. Patent Office.
3. Ser. No. 335,295 "Nuclear Power Plant Training Simulator Modeling Organization And Method" and filed by W. H. Alliston on Feb. 23, 1973 in U.S. Patent Office.
4. Ser. No 335,181 entitled "Training Simulator For Nuclear Power Plant Reactor Monitoring" and filed by W. H. Alliston, F. R. Czerniejewski and B. A. Mutafelija on Feb. 23, 1973 in U.S. Patent Office.
5. Ser. No. 335,288 entitled "Training Simulator For Nuclear Power Plant Reactor Control Model And Method" and filed by F. R. Czerniejewski on Feb. 23, 1973 in U.S. Patent Office.
6. Ser. No. 335,294 entitled "Training Simulator For Nuclear Power Plant Reactor Coolant System And Method" and filed by W. H. Alliston and A. A. Desalu on Feb. 23, 1973 in U.S. Patent Office.
7. Ser. No. 335,285 entitled "Engineered Safeguards Systems And Method In Nuclear Power Plant Training Simulator" and filed by A. A. Desalu on Feb. 23, 1973 in U.S. Patent Office.
8. Ser. No. 335,391 entitled "Fluid Distribution Network And Steam Generators And Method For Nuclear Power Plant Training Simulator" and filed by W. H. Alliston, S. J. Johnson and B. A. Mutafelija on Feb. 23, 1973 in U.S. Patent Office.
9. Ser. No. 335,183 entitled "Training Simulator And Method For Nuclear Power Plant Heater And Non-Linear Modeling" and filed by B. A. Mutafelija on Feb. 23, 1973 in U.S. Patent Office.
10. Ser. No. 335,293 entitled "Secondary System Modeling And Method For A Nuclear Power Plant Training Simulator" and filed by S. J. Johnson on Feb. 23, 1973 in U.S. Patent Office.

BACKGROUND OF THE INVENTION

The present invention relates to the real-time full scope simulation of the dynamic operation of a nuclear powered electrical generating plant for training plant operators.

The increasing demand for well-trained power plant operators together with the complexity of modern day power plants, has led to the realization that the simulator is the most effective tool for such training.

Also, with advancements in nuclear power plant technology, experienced operators from time-to-time need retraining in order to be competent. An actual nuclear plant cannot provide the operator with the required experience, such as starting up, changing load, and shutting down, for example, except after years of experience; and even then, it is unlikely that he would observe the effect of important malfunctions and be able to take the best corrective procedures.

Although simulators have been used for many years, in power plant design, it is only recently that they have been used for power plant operator training. An article in the July 22, 1968 issue of "Electrical World," entitled "Nuclear Training Center Using Digital Simulation" briefly describes the installation of a boiling water reactor plant simulator. An article in the same publication in the Oct. 6, 1969 issue entitled "Huge Simulator to Ready More Reactor Operators" discusses the proposed installation of a pressurized water reactor simulator. In Volume 10, No. 5 of the publication "Nuclear Safety" published during September and October, 1969 is an article entitled "Training Nuclear Power Plant Operators With Computerized simulators;" and in the June, 1972 issue of the publication "Power Engineering" there is an article entitled "Simulators" which describes a number of power plant operator training simulators presently in use or proposed.

Design simulators usually cover only a small part of the process, and may run slower or faster than real-time; while training simulators must operate and respond in a manner identical to the actual plant. A design simulator may involve only a narrow range of conditions, while a training simulator must simulate from "cold" shutdown to well beyond normal operating conditions. A design simulator usually involves only the major process, while a training simulator should cover every auxiliary system with which the plant is concerned.

Training simulators presently in use for operator training, which are more or less complete in their simulation utilize a digital computer that is connected to control consoles that are identical in operation and appearance to the plant being simulated. Also, an instructor's console is connected to control the simulator, introduce malfunctions, initialize the simulated plant at selected states of operation, and perform other functions useful for training purposes and control of the simulator.

In order to be complete, the simulation of the reactor should include xenon calculations and their effect on reactor power at any point in time of operation. Also, in many instances, an instructor may wish to simulate the real-time operation of the plant after a time span in hours or days is supposed to have elapsed, and it is desired that the plant be in an exact condition of operation at the end of the elapsed time. Depending on the power level or condition at which it is to operate after this elapsed time, the various controls are adjusted accordingly.

However, with respect to xenon, the amount builds up slowly in the reactor; that is, it lags behind the power by about eight hours. As the xenon builds up to equilibrium, the reactor power decreases. With decreased power, the amount of xenon decreases, which permits the power to increase. This in turn increases the production of xenon, which create oscillations of xenon that lag behind reactor power in the neighborhood of the 8 hour period. Thus, in order to have an accurate simulation of the effect of xenon at some predetermined time in the future, it is necessary to accelerate the xenon simulation. Also, inasmuch as the amount of decay heat, which depends on the reactor operating time and power output, influences the xenon build up, it is desirable that such influence be included in the xenon simulation.

During actual operation the effect of xenon on reactor power is compensated by the addition and subtraction of boron; thus, it is also desirable that the boron concentration be known at the end of the predetermined elapsed time span.

It is apparent that without the benefit of an accurate xenon acceleration simulator, an accurate simulation would require the running of the simulator for the elapsed time that the instructor desires; and an attempt to calculate for a long elapsed time would prevent accuracy and limit the flexibility of the simulator. Thus, it is desirable to utilize time steps that are small enough to be accurate in their calculations and large enough to prevent an undue delay in arriving at the proper condition of operation for all operating situations both normal and abnormal.

SUMMARY OF THE INVENTION

In accordance with the broad principles of the present invention, a method and system for simulating the real-time dynamic operation of a nuclear power plant for training purposes is provided, which utilizes apparatus wherein a plurality of control devices corresponding to the control apparatus for operating the plant provide input data to a digital computer that calculates physical values including the effect of xenon on a reactor during successive time steps for simulating the power output of a reactor core. The method and system also provides for accelerating the real-time simulation of xenon to permit a future operating condition to be simulated without unnecessary delay.

BRIEF DESCRIPTION OF THE DRAWINGS

FIG. 2 shows a schematic block diagram of the apparatus used in simulating the operation of the plant shown in FIG. 1;

FIG. 95/1A is a functional block diagram illustrating the interconnections of the various individual modules that make up the simulator;

FIG. 96/1 is a front elevation with parts broken away of a typical nuclear reactor of the type being simulated in a system according to the present embodiment of the invention;

FIG. 96/2 is a schematic diagram of a typical reactor core of the type being simulated in accordance with the present invention;

FIG. 96/3 is a schematic representation of a plan view of a reactor core showing a flux thimble and a malfunctioned rod together with coordinates which correspond to coordinates used in associated programs of the simulation;

FIG. 96/4 is a functional block diagram to illustrate the generation of X and Y multipliers for the X-Y flux synthesis approximation;

FIG. 96/5 is a diagrammatic representation of the chambers for ex-core instrumentation simulation;

FIG. 96/6 illustrates a flow chart of the program XELEAP utilized in the accelerated time xenon calculations.

GENERAL DESCRIPTION OF SIMULATED NUCLEAR POWER PLANT

Figure 1:
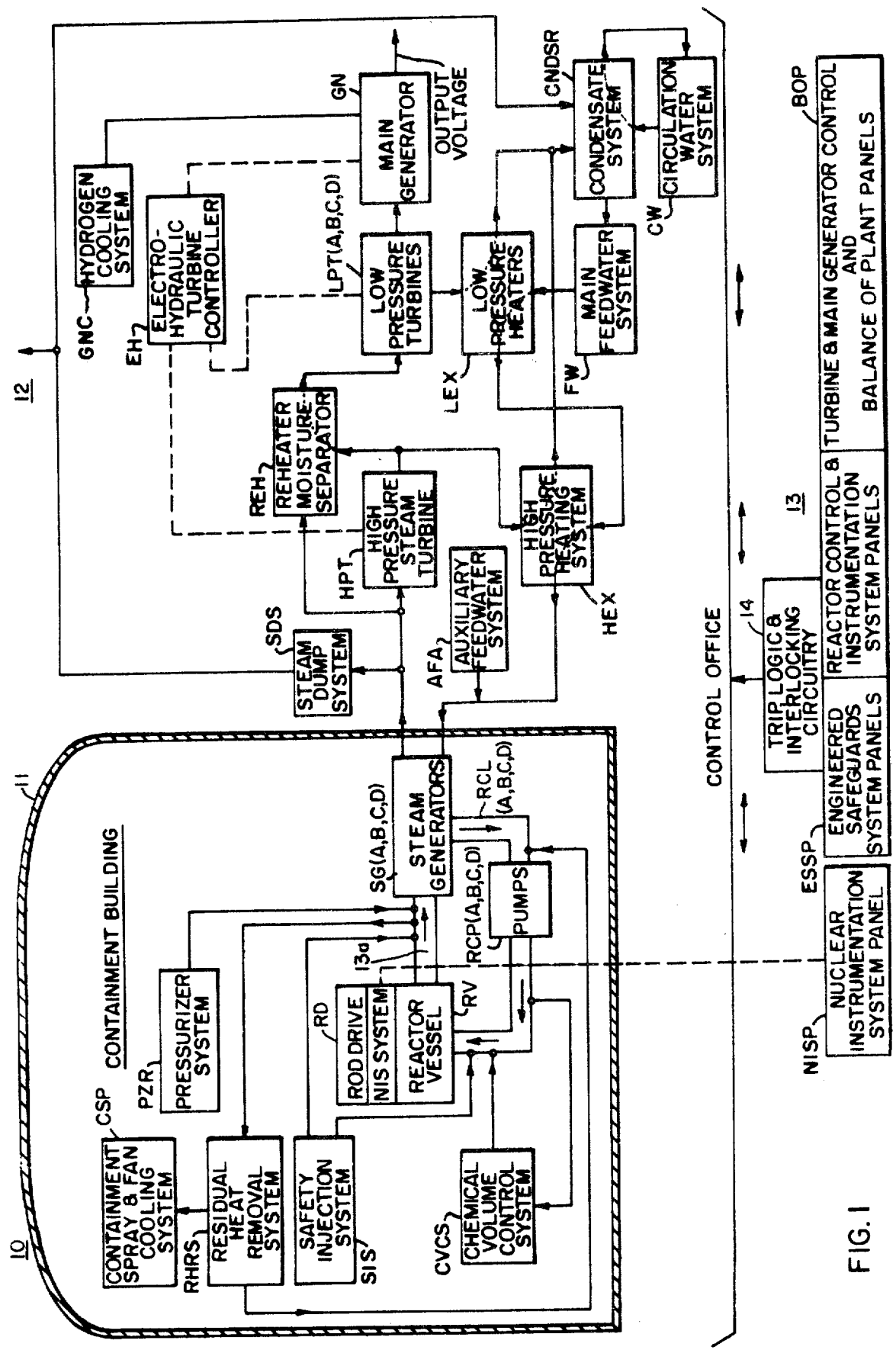
FIG. 1 shows a schematic block diagram of a nuclear powered electrical generating plant that is simulated in accordance with the present invention.

Referring to FIG. 1, the preferred embodiment of the invention is described in connection with the simulation of a nuclear power plant, in this case a four loop pressurized water reactor power plant. Such a plant includes a primary system generally referred to as 10 which is housed in a containment building 11, a secondary system, generally referred to as 12, and a control office that includes control and indication panels 13 for operating and monitoring the various elements in the power station. The plant itself is described herein in a general sense to an extent which will aid in understanding the invention. More detail on the plaant is ascertainable from the more detailed invention description herein. Extensive background information on nuclear plants of various kinds is widely available in prior patents and publications. Certain invention features are applicable to nuclear plant types other than the pressurized water type.

The primary system includes a nuclear reactor housed in a reactor vessel RV and in this instance four closed reactor coolant loops RCL (A, B, C, and D), connected in parallel to reactor vessel RV. Each loop contains a reactor coolant pump RCP (A, B, C, and D) and a steam generator SG (A, B, C, and D). The reactor vessel RV, reactor coolant loop piping RCL, pumps RCP, and primary side of steam generators SG, all from what is referred to as a reactor coolant system RCS. The primary system 10 also includes an electrically heated pressurizer system PZR and certain auxiliary systems hereinafter described.

High pressure water circulates through the reactor vessel RV to remove the heat generated by a nuclear chain reaction within a fuel arrangement disposed in the reactor. This heated water exits from the reactor vessel RV and passes via the coolant loop piping RCL to the steam generators SG. In the steam generators SG, the coolant water gives up its heat to the feedwater in the secondary side of the steam generator SG to generate steam for a turbine driven electrical generator GN. The reactor coolant cycle is completed when the coolant is pumped back to the reactor vessel RV for reheating in the nuclear reactor.

Rod drive system RD is used to control reactor power level and consists of clusters or banks of movable cylindrical neutron absorber rods. The absorber rods move within guide tubes in certain fuel assemblies in the reactor fuel arrangement. The reactor coolant pumps RCP are vertical single stage mix flow pumps of the shaft seal type; and are designed so that adequate coolant flow is maintained to cool the reactor core adequately under all conceivable circumstances. The steam generators SG are vertical U-tube units that contain integrally therewith, in the secondary side, moisture separation equipment that reduces the moisture content of the steam to one-quarter percent or less. The electrically heated pressurizer PZR connected to one of the four reactor coolant loops RCL maintains the reactor coolant system RCS pressure during normal operation, limits the system coolant pressure variation during plant load transients, and keeps the system coolant pressure within design limits during abnormal conditions.

The reactor operating level is controlled inherently by a negative temperature coefficient of reactivity of the water; by control rod cluster positioning as already indicated; and by a soluble neutron absorber, such as boron in the form of boric acid. The boric acid is inserted into the coolant during cold shutdown, partially removed during startup, and adjusted in concentration during the life time of the fuel in the core to compensate for such effects as fuel consumption, and accumulation of fission products, which tend to slow the nuclear chain reaction.

The primary system includes engineered safeguard systems, ESS including chemical and volume control system CVCS, safety injection system SIS, residual heat removal system RHRS, containment spray and fan cooling system CSP, and an accumulator discharge system (not shown) which is described in detail in connection with the description of the individual models.

The chemical and volume control system CVCS performs a number of functions, such as filling the reactor coolant system RCS, providing a source of high pressure water for pressurizing the system RCS when cold, maintaining the water level in the pressurizer system PZR when the RCS system is hot, reducing the concentration of corrosion and fission products in the reactor coolant, adjusting the boric acid concentration of the reactor coolant, and providing high pressure seal water for the seals of the reactor coolant pumps RCP.

The residual heat removal system RHRS portion of the engineered safeguard systems ESS transfers heat energy from the reactor core and the system RCS during plant shutdown and refueling operations. Components in the residual heat removal system RHRS are also employed in conjunction with the safety injection system SIS.

The safety injection system SIS supplies borated water to the system RCS to limit the fuel rod cladding temperature in the unlikely event of a loss of coolant accident. Also, the system SIS functions to provide a means of introducing a spray of borated water into the containment 11 as an additional dynamic heat sink. The system SIS includes several independent subsystems characterized by equipment and flow path redundancy. This redundancy assures complete reliability of operation, and continued core cooling even in the event of a failure of any single component to respond actively as intended. For example, during the passive accumulator injection phase of the system operation which is described in connection with the individual models, accumulator tanks rapidly inject borated water into the reactor coolant system automatically when the depressurization of loops RCL causes a reversal of the pressure drop across the accumulator check valves. The accumulators provide rapid cooling of the reactor core for large breaks which would otherwise result in core uncovering and overheating before the electrically driven low head safety pumps of the SIS system are energized and delivering coolant. The low head system of safety injection provides for injection of borated water into the RCL loops for large breaks, which would result in rapid blowdown and depressurization. A high head system for injection into the loops RCL for small breaks is provided for those instances that would result in slow blowdown and depressurization. The low head system utilizes pumps of the residual heat removal system RHRS which takes water from a refueling water storage tank, and pumps borated water through one of the residual heat exchangers, through an injection header and injection lines to each of the reactor coolant loops. The high head safety injection phase utilizes two subsystems which provide extremely rapid response to an SIS system actuation signal, utilizing a boron injection tank and a charging pump of the chemical and volume control system CVCS.

The containment building 11 completely encloses the entire primary system and insures that an acceptable upper limit for leakage of radioactive materials to the environment is not exceeded, even if gross failure of the elements contained therein were to occur. The containment spray system CSP is included in the primary system to limit the pressure in the containment atmosphere to below the containment design pressure, and remove sufficient iodine from the containment atmosphere to limit the radiation doses to safe value. This system delivers NaOH to the space within the containment building 11. The reactor containment fan cooling system portion of CSP which is also part of the containment building monitoring system removes heat from the containment building during normal operation, and during any loss of coolant accident. When a loss of coolant accident is sensed, the fan motors are automatically switched to low speed to provide circulation of the steam-air mixture in the containment building.

The steam generators SG (A, B, C, and D) deliver steam at appropriate pressure and temperature in the secondary system for conversion to mechanical and then to electrical energy in the turbines and the generators, respectively. The secondary steam is additionally used for various operational auxiliary services such as turbine shaft steam seals, turbine drives for main and auxiliary feedwater pumps and steam jet air ejectors.

Steam is admitted to a double flow high pressure turbine HPT that is controlled by governor valves with quick acting throttle or stop valves ahead of them for rapid isolation in an emergency. Four separate pipes convey steam from the governor valves to the turbine nozzle chambers. The steam passes through an impulse blading or control stage and a number of reaction stages of the high pressure turbine HPT; the impulse chamber steam pressur is measured and used as a load measurement for use in reactor control.

On leaving the last row of high pressure blades, the steam has a moisture content of approximately 10%. Thus, the steam is then passed through a moisture separator and reheater REH to improve the turbine efficiency and reduce the low pressure turbine exhaust moisture. The exhaust steam from the high pressure turbine when first passed through the moisture separator portion REH removes approximately 10% of the flow which is extracted as moisture. The remaining 90% flows through steam heated reheater portion of REH where it receives approximately 100°F superheat. The moisture is removed and drained to a heater drain tank (not shown); and the steam which rises above the moisture separator passes over the reheater and is reheated by live steam.

The hot reheated steam is conveyed to the double flow low pressure turbines LPT (A, B, C) the number of which in use can depend on the electrical output required. The low pressure turbine exhaust directs the steam to a condenser CNDSR that has cooling water passing through tubes which condense the steam to water where it is collected in a chamber, called a hot well. The condenser cooling water is controlled by circulating water system CW. The condensate system CNDSR and the feedwater system FW return the condensed steam from the turbine condenser, and the drains of the regenerative feed heating cycle, to the steam generators SG (A, B, C, and D) while maintaining the proper water inventories throughout the cycle.

The feedwater system FW conveys the feedwater through low pressure heaters LEX and then through high pressure heaters HEX to the generators SG. The auxiliary feedwater system AFA is used when the main system is inoperative. These systems automatically maintain the water level of the steam generators SG during both steady-state and transient operation.

The turbine HPT is equipped with an electrohydraulic control system EH comprising a solid state electronic controller and a high pressure fluid supply. The electronic controller computes a control signal based on measured turbine speed, measured first stage steam pressure, and speed and loss reference values established by the dispatcher or initiated at the operator's control panel 13. The control signal is transmitted to the electrohydraulic actuator of each main steam throttle and/or governoring valve to produce the valve positioning needed to meet the reference load. During turbine startup, the throttle valves are position controlled to accelerate the turbine from turning gear or higher speed up to synchronous speed. The high pressure hydraulic fluid system provides the power for all turbine steam control valves, electrohydraulic actuators, and positions the governor valves in response to the electric control signals from the electronic controller. The interceptor valves are also operated by the hydraulic fluid, and they may be position controlled or simply controlled to be either open or closed.

The electrohydraulic control system provides turbine control during all phases of operation by varying the turbine valve opening. Hydraulic cylinders move the valves to the required opening with electrically operated servo-valves controlling the cylinder's position.

The main generator GN operated by the turbine is a hydrogen inner cooled synchronous generator with a water cooled stator and an output voltage of approximately 22 to 25 kV at 60 cycles. The excitation is provided by a shaft driven air cooled brushless exciter. Cooling for the generator is provided by system GNC which circulates hydrogen at a pressure of about 75 psig through the generator GN by fans attached to the generator shaft.

Various plant parameters including reactor parameters, coolant and steam pressures, temperature, and flows and liquid levels in the various systems, as well as the speed of the turbines and electrical output of the generator are sensed and displayed through meters, alarms, and annunciators on the central office panel 13. Among the reactor parameters the position of the rods of the reactor and the state of all operable components are displayed to inform the operator of the condition or state of operation of the nuclear power plant.

The state of operation of the various components of the plant and certain fluid pressures, temperatures, and levels are connected through interlocking and logic circuitry 14 to prevent unsafe operation of selected system components and to trip or shut down the plant under abnormal conditions.

Nuclear instrumentation panel NISP is provided with various recorders, indicators, meters, and selector switches to display the neutron flux values in various sectors of the reactor, both in an axial and radial direction, which function is termed in-core flux mapping.

Also, a portion of the panel NISP displays through meters the flux in various sectors of the reactor vessel RV to inform the operator of the various ranges of nuclear flux, such as source, range, intermediate range, and power range of the reactor during start-up and shutdown, which operation is termed ex-core radiation detection. Further, the temperature of individual fuel rods of the reactor, and the radiation in various parts of the plant are monitored and displayed on the panels NISP. Finally, the auxiliary power to the plant is controlled by a portion of the panel NISP.

GENERAL DESCRIPTION OF SIMULATOR CONFIGURATION

The nuclear power plant simulator according to one embodiment of the invention comprise digital computation apparatus and peripheral equipment operatively connected to control and indication panels which are identical in appearance and wiring to the actual control and indication panels of the four loop pressurized water reactor power plant that is simulated. The general function, structure, and operation of digital computers is set forth in a publication entitled "Electronic Digital Systems" by Mr. R. K. Richards, which was published in 1966 by John Wiley and Sons, Inc. and bears the Library of Congress card catalog number 66-17618, to which reference is made for a detailed description thereof in order to aid in an understanding of the apparatus and methods in carrying out the invention.

Specifically, and referring to FIG. 2, the simulation system includes a Sigma 5 digital computer 20 referred to at times in this specification also as the "C" machine and associated peripheral equipment. The Sigma 5 computer system is manufactured and sold by Xerox Data Systems, Inc. and has been in general use for over one year prior to the filing date of this application. For more information on the Sigma 5 computer system reference is made to the appendix.

The simulator also includes digital computers 21 and 22 referred to at times hereinafter also as the "A" machine and "B" machine, respectively and associated peripheral equipment of the type manufactured and sold by Westinghouse Electric Corporation, and which is known as model p2000, and which computers have been in general use for over 1 year prior to the filing date of this application. The P2000 digital computers 21 and 22 are described in a publication entitled "Prodac 2000 Computer Systems Reference Manual" copyrighted in 1970 by Westinghouse Electric Corporation and bears copyright Registration No. A244775, to which reference is made to aid in an understanding thereof.

The Sigma 5 computer, or C machine provides an extensive arithmetic capability for the power plant simulator. The computers 21 and 22, act as process input/output controllers for the C machine. In practicing many features of the invention, a single computer or other multiple computer arrangements may be employed.

Communication between the A, B, and C machines is provided by a combination of the Xerox Data Systems Model 7650 channel interface units 23 and 24, and high speed data link devices 25 and 26 respectively. The C machine provides the software control and synchronization for the multiple computer configuration involving the A machine, B machine, and C machine; and the A and B machines in addition to providing the process input/output capability for the C machine also provide a capability for instantaneous simulator responses through their external interrupt system, the processing of all interlock and protection system logic, and the processing of several employed in the simulator models, such as a reactor control rods program.

The simulation of the electrohydraulic control system EH as depicted in FIG. 1 and represented by a simulator panel portion 27 of FIG. 2 is accomplished in part by the actual analog electrohydraulic controller manufactured and sold by Westinghouse Electric Corporation, which has been in use for more than a year prior to the filing date of this application. The panels 27 through 35 in FIG. 2 provide the same outward appearance and operation as panels in an actual plant and are connected directly through appropriate computer system equipment to the A machine and the B machine.

Instructor's console 36, which provides the control facility to start, stop and manipulate the simulator is connected to software in the B machine.

A basic real time batch monitor (hereinafter referred to as RMB) software system of the C machine is a two partition system designed for normally running simultaneously foreground and background programs. The foreground programs include the system software extension programs which are made up of a sublevel processor, data link handler, and disc handler. Such foreground programs also include data conversion routines, and various dynamic models for the simulated system, which include reactor models, primary system models, secondary system models, a valve handler routine, a pump handler routine, and a controller handler routine. In order to permit an economy in core memory requirements, in the present embodiment of the invention the foreground programs and the background programs are not run at the same time.

Referring to FIG. 95/1A, control rod drive model T1 (A machine), which provides a continuous variable truncation approximation for neutron absorbing control rod positions and indications, operates in response to inputs L1 which include the full length and part length rods in and out panel switches, the rod control mode select position, the rod start up reset pushbutton, the trip and trip reset pushbuttons, permissive interlock pushbuttons and rod. Input L2 is also applied to the model T1 and, it comprises rod speed and direction in the automatic mode from an automatic rod control model RODGO(T2), which calculates a transform approximation of the Automatic Rod controller.

Automatic Rod Control model T2 operates in response to input L3 comprising the nuclear power rate which is the output from the EX-CORE instrument model DETOUT, which calculates the meter output from the Ex-Core nuclear chambers, referred to at model T3. The 15 rod bank and/or group positions, and the 10 malfunction rod positions, which are calculated in the model T1, form an input L4 from T1 to the nuclear cross-section model (SIGMAS) T4, which provides the 1½ energy group cross-sections.

L4 is also applied as an input to the X-Y synthesis model PLTLT, which calculates neutron flux vector components, referred to as T5; core exit thermocouples model TMCPLS, which calculates the average channel with local tilt and rod factors, referred to as T6; and the trace generation model T7 which provides the numerical flux fit for In-Core traces. The model T4 responds to the neutron flux input (22 mesh points) L5 which is calculated in the one dimension space time kinetics with delayed neutrons model FCALC referred to at T8. The T8 output L5 is also the input to the xenon model (POISON, PADE) T4A which provides the analytic solution for Xenon for input L6 to the model T4. Also, the model T4 has applied to it the reactor boron concentration represented by input L7 from the output of the model RCS boration (RCBORC) referred to at T9, which integrates boron inflow and outflow to obtain net boron concentration in the RCS and isolated loops. The model T4 also receives the output L8 from model RCS thermal (RCSLOP) T10, which calculates enthalpy distribution around the RCS loops, the reactor core inlet enthalpy and the average exit enthalpy. The model T4 acts on inputs L4, L5, L6, L7, and L8 to produce 22 diffusion coefficients, 22 absorption cross-sections, 18 neutron yields, 18 energy yields, and 22 neutron velocities which are input as L9 to the one dimension space time model T8.

In addition to the output L5, the model T8 provides 22 neutron flux calculations over output L10 to the input of the models T3 and T7. Also, the model T8 produces the total fission power (output L11) which is used in the calculation of the X-Y Synthesis model T5 and the decay heat (FPROD) model T11, which calculates the eight fission products, one node heat generation. The total fission power at output L11 is summed with the calculated decay heat power at output L12 from the model T11 to produce the total core power as an input L13 to the reactor thermal hydraulic (THERMO) model T12. The latter model calculates reactor flow and heat transfer.

The probe drive model T13 provides output L14 to the probe position indicators on the NIS panel and also provides an input to the model T7 which comprises thimble selection and the probe position in the thimble, of which there are six maximum. The X-Y xenon (XEOSCL) model T15 provides an output to the model T6 and the planar tilt at the thimbles (TILT) model T16 which comprises two X-Y xenon tilt component factors. The calculations of the model T16 and the model T15 operate on two X-Y gross flux tilt component factors from the output L16 of the model T5. The model T16 in response to the inputs L15 and L16 calculates the X-Y tilt factor at each thimble location for output on L17 to the model T7. The model T5 also provides X-Y tilt factors at each Ex-Core chamber location (output L18) for the model T3.

The Trace Generation model T7 in response to the inputs L17, L4, L10, and L14 produces output L19 the flux trace at each selected thimble up to 6 maximum for input L19 to the trace and TC input/output format and scaling (AUXIL) model T17. The points on each trace are output at L19 sequentially; that is, one point at a time corresponding to the probe position. A total of 120 points is supplied for each complete trace. The model T6 in response to the inputs L8, L4, and L15 produces at its output L20 the temperature at a selected thermocouple which is input into the model T17.

The model T3 calculates the flux at the Ex-Core chamber location for the source, intermediate, and power range meters on the NIS panel over output L21; the source range reciprocal count rate for the audio count rate meter over output L22, which reciprocal is coded as a 16-bit binary number and is output on 16 output contacts; and on output L23, the total neutron and delta flux for each long ion chamber location for the power range control panel. The model T3 also calculates over output L24 the total neutron flux for each long ion chamber location and the rod drop differentiator signal for the limit check (LIMP) model T18 which checks the limits of the parameters for the trip logic and annunciators on the control panel. Also, the flux at each half chamber location, which there are a total of eight, is applied from T3 as an input L25 to the overpower and overtemperature protection (SETTMP) model T19, which model calculates Z-transforms approximations for DNB protection. The output of the limit checks model T18 comprises alarm and annunciator actuation signals, reactor plant permissive signals, reactor protection trip signal, and reactor rod stop signal represented at L26. The model T19 responds to the input L25 and the input L28 which comprises the loop average temperatures, loop delta temperatures, and system pressures to produce the overpower and overtemperature protection trip signals L27 for input to the limit checks model T18.

The inputs L8, and L13 previously described and the input L37, which represents reactor core fluid flow, are applied to the reactor thermal hydraulic model T12 which in turn generates output L29, i.e., the core outlet fluid enthalpy, for input into the RCS thermal model T10.

Referring to FIG. 96/1, a pressurized water reactor for a four loop plant, is illustrated, the operation of which is simulated in accordance with the present embodiment.

In FIG. 96/1, reactor vessel 100 is a cylindrical shell which has a plurality of inlet nozzles such as 101 and outlet nozzles such as 102 for circulating the reactor coolant to the steam generator. The vessel 100 contains the fuel rods in a core arrangement that undergo a chain nuclear reaction to produce usable energy in the form of heat, and it further includes various internal assemblies for controlling the rate of heat generation. Reactor control is provided by neutron absorbing control rods 103 and by a homogeneous neutron absorber, such as boric acid, dissolved in the reactor coolant. The control rods 103 are utilized to start up, follow load changes, to provide reactor trip capability, and to furnish control for slight deviations in reactivity due to temperature. In the event of a reactor trip, the control rods 103 fall into the core by gravity. The concentration of the boric acid in the coolant is varied during the life of the core to compensate for changes in reactivity that occur with fuel depletion, as well as to compensate for the reactivity associated with xenon transients arising from power level changes.

In simulating the nuclear reactor, which includes the control of the reactor, and the condition of the reactor including malfunctions for the purpose of training, a number of individual models are utilized in the computer system. These models include a space-time neutron kinetics model which simulates the total power of the core and the spatial power distribution. A flux synthesis for the horizontal axis of the core, that is the flux distribution outwardly form the center of the core; a model for simulating the decay heat of the reactor to represent that heat which becomes prominent subsequent to the shutting down of the reactor; the model to simulate fuel burnup and PU production; the core exit thermocouple model for calculating the fuel assembly outlet temperatures; the automatic rod control; the simulation of the build up of xenon; the thermohydraulic modeling of the reactor core; the model for simulating the set points and limits of the reactor; the model for measuring the in core flux traces; and the out-of-core detectors are all used in the overall simulation of the reactor.

In addition to the position of the control rods 103 previously described, temperatures, nuclear flux, and power are measured throughout the reactor core and the reactor vessel. Referring to FIG. 96/2, a schematic diagram of the reactor core is illustrated having a vertical Z-axis, and horizontal axes X and Y to which reference will be made throughout the description. In the reactor core, the fuel assembly temperature is measured by thermocouples which are permanently mounted in the plane of the X and Y axes at the top of the core at selected locations. There are in total 65 individual thermocouples.

The neutron flux is measured in selected fuel assemblies by six miniature flux detectors that move upwardly along the Z-axis, and in particular fuel assemblies, spaced relative to the horizontal X and Y axes as selected by the operator. Outside the reactor core, the neutron flux is measured at predetermined points around the periphery of the core as shown in FIG. 96/2 to detect the flux in the source range, the intermediate range, and the power range of operation.

The neutron flux and power are measured in three dimensions of the cylindrical core. Thus, in the reactor being simulated the flux distribution can be determined in three dimensions along the Z-axis vertically and along the X and Y axes horizontally.

In accordance with the present embodiment, to obtain a simulation of the total power, and core spatial power distribution effects, the coupled space-kinetics model T8 is used. The T8 model calculates a modified one group flux along the Z-axis from diffusion theory and adds point by point delayed neutrons to obtain a fission power distribution. A radial tilt synthesis is utilized for the spatial distribution effects along the X and Y axes.

The space-time neutron and kinetics model T8 provides variation in control rod worth with the changes in flux shape along the Z-axis. This spatial power model provides correct response in the direction of the Z-axis for permitting training emphasis in such aspects as part length rod control, for example.

The actual solution of the neutron diffusion equations is used for the Z-axis direction. In simulating the fission power distribution along the Z-axis, a single dimension differential technique is employed.

Referring to FIG. 96/2, 22 nodes are assumed along the Z-axis which are designated G1 through G22 inclusive. G1 and G2 and G21 and G22 are assumed to be located outside the length of the fuel rods to act as neutron reflectors, which in a real reactor simulates the reflective effect of water in the reactor. At each of these nodes G1 through G22 inclusive, six delayed neutron time groups are calculated. The six time groups represent the different time fission effects of the most important delayed reaction isotopes in a nuclear reactor of the type being simulated in the present embodiment. The simulation for the one dimensional space-kinetics is mechanized in the program FCALC and begins with a steady-state eigenvalue problem solution which provides a $K_{bias}$ that is interpreted as the calculated K for measured critical of the reactor.

When the reactor is shut down, there will be an output of decay heat which is dependent upon the amount of time and at what power level the reactor has been operating. The input to the decay heat model T11 (FPROD) is the average reactor fission power calculated in the routine FCALC to produce an output representing the fission product heat for the reactor thermal hydraulic model THERMAL.

Decay heat is caused by eight isotope groups, two of which are U239 and Np239. The remaining six are fitted from the product decay curve for infinite radiation. In simulating this decay heat generation, eight decaying exponentials, which are modeled by first order lag functions that approximate the decay of the main gamma decay heat precursors are utilized. The sum of these eight decaying exponentials are initialized to represent operation at the average power level which exist for several hours prior to shutdown. Once the time, or point in life, from initial conditions is input into the decay heat model, such time is updated periodically to remember the power and the time that the reactor simulation is operating. In integrating a time X power level, a factor 1-B is multiplied by the yield of each of isotope of the six regular groups and U239. The differential equations for this calculation are as follows:

$$dD_i/dt = a_i P_r(1 - B_i) - \lambda_i D_i$$
$$i = 1, T$$
$$dD_8/dt = a_8 D_7 - \lambda_8 D_8$$

where $D_i$ is the heat in watts produced by the $i^{th}$ product, $a_i$ is the full irradiation yield, $P_r$ is the reactor power in watts, $\lambda_i$ is the decay constant and $$B_i = e^{-\lambda_i T'} \rightarrow 0 \text{ as } T' \rightarrow \infty$$

with $T' = \int \dfrac{P_R}{P_{RATED}} dt$ for $P_R > .01 P_{RATED}$ and $B_i = B_i + \dfrac{\lambda_i \int dt}{2}$ for $P_R < .01 P_{RATED}$ with
$$0 \leq B_i \leq 1$$

The constants used in solving the above decay heat equations are as follows:

| Group | $\tau_i = \lambda_i^{-1}$ | $a_i$ | |
|---|---|---|---|
| 1 | 1.262×10⁶ | .004485 | |
| 2 | 18400 | .011 | |
| 3 | 1420 | .01035 | |
| 4 | 333 | .0073 | |
| 5 | 123.3 | .0105 | |
| 6 | 10.335 | .01622 | |
| 7 | 1410 | .0019622 | (U239) |
| 8 | 201312 | 1.20888 | (Np239) |

$\sigma a_i = .064189 =$ total decay heat at infinite irradiation.

During initialization, a time $T1$ at full power is used in calculating the term $B_i$ and solving for $D_i$ assuming $dD_i/dt \approx 0$. The total decay heat is then subtracted from the input power to the reactor to determine the direct fission power. Residual fissions on the usual decay heat curves, which represent a one time group delayed neutrons is accounted for in the space kinetics model for delayed neutrons hereinbefore described.

The inclusion of the factor $1 - B$ which accounts for the non-infinity of radiation is a function of an exponential decay for a time constant. For example, when operating at zero power, decay heat can never be built up; when operating at one-half rated power, for example, the decay heat will only be built up proportionately. When the reactor is operating at 1% power, the ability to build up decay heat is degraded so that an exponential function is added which approaches zero to take the reduced build-up into account. As the time $T$ gets larger and larger it becomes $-T$ which goes to zero, and $T'$ goes to infinity. $B$ starts to approach one, as time goes on, which means that if the reactor was started, and then immediately shutdown after a short predetermined length of time it is simulated as a clean reactor with no decay heat.

Isotopes of iodine, which are reaction fission products decay into high neutron absorbing isotopes of xenon. The amount of xenon builds up slowly in the reactor, that is, it lags behind the power by about 8 hours. As the xenon reaches equilibrium, the reactor power decreases. With decreased power, the amount of xenon decreases, which permits the power to increase. This in turn increases the production of xenon, thereby creating xenon oscillations which lag behind reactor operation in the neighborhood of eight hours. These oscillations are reflected under normal conditions in the vertical dimension of the core; that is, the neutron flux increases and decreases proportionally from the top to the bottom. In the event of a dropped or withdrawn rod malfunction, the horizontal plane tilts in the direction of the malfunctioned rod, which results in the delayed xenon oscillations occurring in a manner such that they are not symmetrical with respect to the horizontal reactor plane, and the amplitude of the oscillations are dependent on the distance of the malfunctioned rod from the center of the core.

The xenon oscillations are monitored in the ex-core chambers which are located at the core periphery adjacent the upper and lower portions of the core in the four quadrants of the core, the flux mapping recorders which detect flux throughout the core by detectors moving the flux thimbles and of course, the meter for indicating temperature of the reactor water adjacent the fuel assemblies.

In the simulation of xenon for the Z or vertical axis, the concentration is calculated from the output of model T8 for input to the nuclear cross-sections model T4 by the xenon calculation model T4A.

In simulating xenon in the T4A model, the average power of the reactor and the flux and fast neutron to thermal neutron ratio for each of the mesh points in the space-time kinetics model T8 are input to the program to provide a xenon concentration for each mesh point. Each one-half second, one point in the mesh is updated by analytic solution from this average power, the flux and fast to thermal ratios with two dummy points at opposite ends of the core. Thus, every 10 seconds the entire core is updated for xenon concentration.

The differential equations for the xenon calculation are as follows:

$$\dfrac{dI}{dt} = Y_I \Sigma_f \phi - \lambda_I I$$

$$\dfrac{dx}{dt} = Y_x \Sigma_f \phi + \lambda_I I - (\lambda_x + \phi^T \tau_x) x$$

Analytic solution is possible given $\phi^T$, the thermal flux.

$$I = I_0 e^{-\lambda_I t} + \dfrac{Y_I \phi \Sigma_f}{\lambda_I}(1 - e^{-\lambda_I t})$$

$$X = \dfrac{(Y_I + Y_x)\phi\Sigma_f}{\lambda_x + \phi^T \tau_x}\left[X_0 - \dfrac{(Y_I + Y_x)\phi\Sigma_f}{\lambda_x + \phi^T \tau_x} - \dfrac{\lambda_I I_0 - Y_I \phi \Sigma_f}{\lambda_x + \phi^T \tau_x - \lambda_I}\right] e^{-(\lambda_x + \phi^T \sigma_x)t}$$

$$+ \dfrac{\lambda_I I_0 - Y_I \phi \Sigma_f}{\lambda_x + \phi^T \tau_x - \lambda_I} e^{-\lambda_I t}$$

The quantity is calculated from $$\frac{(K\Sigma_f)\phi}{K}, K = 191 \text{ Mev/fission}$$

where $\lambda$'s are the natural time constant, $\sigma_f Q$ is the forcing function, and $\phi TJ$ is the sink function. Although the natural time constants are much longer than 10 seconds, the period of xenon calculation, the forcing function and the sink functions may change significantly within this period or a longer period. The average values for $\phi$ and $\phi T$ are calculated for each point in the space kinetics model.

In simulating the effects of xenon in the plane of the X-Y axis, the X-Y synthesis model T5 includes provisions for the calculation for the ex-core detector monitoring and flux mapping simulation.

Xenon oscillations are approximated by second order differential equations whose periods of oscillation and damping ratio are obtained by actual plane measurement.

Two oscillations, one for the Y-axis and one for the X-axis, are considered. The forcing function is the sum of the planar tilts which enables more than one malfunction to occur during the oscillating period. The differential equations for the X and Y axes are as follows:

$$X + ax + bx = \sum_{i=1}^{10} f_{x_i}(t)$$

$$Y + ay + by = \sum_{i=1}^{10} f_{y_i}(t)$$

where the values A and B are chosen in accordance with the above-mentioned test and the forcing function is proportional to the tilt angle $\phi$. The above equations approximating xenon are solved at the same rate as the xenon depletion in the preceding Z-axis diffusion calculation.

Referring to the block diagram of FIG. 96/4, in addition to the xenon approximation, terms are added to approximate the "prompt" and delayed neutron X-Y spatial effects. The "prompt" term is assumed to be instantaneous while the "delayed neutron" term is approximated by a single first order lag function similar to a single delay group model.

Referring to FIG. 96/2, the ex-core ion chambers are located 90° apart. The influence of the malfunctioned rod on each chamber is obtained by vector decomposition of the malfunctioned rod position. The malfunctioned rod and the X-Y axes in the direction of the chambers is decomposed in two orthogonal vectors. The malfunctioned rod causes xenon oscillations and each ex-core chamber will be effected in accordance with the vector decomposition. The angle between the malfunctioned rod and chamber 1 is the symbol lambda, which position is decomposed in the direction of chambers 1 and 2 as:

$x = d \cos$
$y = d \sin$

The factors which are used with each chamber reading and represent X-Y flux distribution are given as:

$Ch_1 \theta_i = Xe_{osc} \cdot x$
$Ch_2 \theta_i = Xe_{osc} \cdot x$
$Ch_3 \theta_i = Xe_{osc} \cdot x$
$Ch_4 \theta_i = Xe_{osc} \cdot x$ The decomposition is done for all four quadrants of the core where the ex-core chambers are in the path of the X-Y axes. For example, if the rod drops at $a = 45°$, lambda is equal to zero and chambers 2 and 4 will not be effected by any flux tilt, while chamber 1 will have a maximum tilt effect in the downward direction and chamber 3 will have a maximum tilt in the upward direction.

Once a reactor power change occurs, a long time is necessary to achieve equilibrium of xenon. For example, if the reactor is at zero power and is brought to full power approximately 2 days is required for the xenon to be in equilibrium or steady-state. For training purposes therefore it is obvious that the instructor needs to have intermediate points and/or the equilibrium point to train at without waiting an extended period of time to achieve it.

In accomplishing the xenon simulation in this aspect, it is necessary to provide a solution to the non-linear flux-xenon system while maintaining a critical reactor. Such a problem is termed non-linear because the flux is dependent on the xenon and similarily the xenon is dependent on the flux. Thus, a clean analytic solution is less satisfactory than an approximate iterative solution. Also, as time proceeds, the amount of the decay heat changes; and therefore, the amount of fission power, which is proportional to flux, varies to maintain a specified power level.

Referring to the flow chart FIG. 96/6, the program XELEAP is used in the model by first changing the reactor power to some new value either by rod movement or boron change; and then if the instructor wishes to illustrate the long term effects of xenon several hours later he interrupts the computer to stop the simulation. He then enters the value of the time step that he wishes to take. To aid in the accuracy of the solution, without greatly reducing the speed, the time step which is specified is internally divided into five hour segments. However, the instructor sees only the full step which he specified. Then, the program XELEAP is called in from disk and the decay heat using average parameters is iterated until the fission power equals the total power minus the decay heat power. Then, a time function is used for total flux, thermal flux and fission cross-section and each space node G (see FIG. 96/2). Then these linear functions are used to integrate the xenon and iodine differential equation using rates of change and time step. Next an estimate of the compensating change in boron is made, which estimate is used in the calculation of the multiplication and flux. The boron is iterated until the multiplication is one or critical. The flux produced from this critical reactor condition is then used to reapproximate the linear function which produces a new xenon and iodine function. Then when the flux is converted to xenon and the last five hour time step is reached, the delayed neutrons, detector outputs, and the xenon and iodine index are set. The results are then printed and control is returned to the computer to commence simulation.

The time step taken need not produce an equilibrium solution but only a critical one. Thus, an instructor can get to any point of the xenon oscillation, power startup, or partial shutdown in a few minutes.

If it is desired in the simulation to provide for an accelerated xenon solution only at shutdown where no fission flux is utilized to calculate iodine, xenon and fission products decay heat for a time, the routine TSTEP can be utilized which provides analytic time steps for fast xenon and decay heat at shutdown. This program or subroutine is run on-line from the programmer's console of the C computer and allows large time steps to be taken.

It is understood that the various inventive features in the improved method and simulation system, may be implemented in either an analog, digital, or analog/digital with or without single or multiple computer apparatus. Also many of the features are applicable in the simulation of other pressurized water reactor plant arrangements, boiling water reactor plants, and gas and other nuclear plant arrangements.

Reference is made to U.S. patent application bearing Ser. No. 333,901 entitled "Training Simulator For A Nuclear Power Plant" and filed by G. L. Gregg, R. E. Putman and J. W. Gomola which is assigned to the present assignee and filed concurrently herewith; and which is incorporated herein by reference and made a part hereof.

I claim:

1. An automated training simulator for the real-time dynamic operation of a nuclear reactor in which the power output of the reactor is influenced by xenon over an extended period of time; said simulator comprising
   a control console having command devices operable to generate input data values
   calculating means including sequence controlling means having the following components
      a. first means to generate a data value relating to reactor power output in accordance with a data value relating to nuclear flux,
      b. second means to generate a data value relating to xenon concentration in accordance with the generated reactor power data value,
      c. third means to generate a data value relating to neutron absorption in accordance with the generated xenon concentration data value,
      d. fourth means to generate said data value relating to nuclear flux in accordance with the generated neutron absorption data value and the input data values; and
   indicating devices governed by selected ones of the generated data values to monitor the operation of the representative reactor.

2. An automated training simulator according to claim 1 wherein the calculating means is structured in a programmed digital computer means and the data values are generated during each time step.

3. An automated training simulator according to claim 2 wherein each generated data value relates to a respective one of a plurality of spaced locations along a vertical axis of a representative nuclear reactor.

4. An automated training simulator according to claim 3 wherein the calculating means is structured in a programmed digital computer means, and each data value relating to xenon concentration is generated repetitively for each said spaced location during alternate time steps of said calculating means.

5. An automated training simulator for the real-time dynamic operation of a nuclear reactor in which xenon increases and decreases over an extended period of time; said simulator comprising
   a control console having command devices relating to reactor control devices operable to generate input data values;
   calculating means including sequence controlling means having the following components
      a. means to generate data values relating to boron concentration in accordance with data values including input data values,
      b. means to store a first data value relating to a reactor critical bias factor,
      c. means to store a second data value relating to an approximation of xenon concentration for a first lapsed time,
      d. means to generate iteratively a third data value relating to a reactor critical bias factor in accordance with data values including the first and second data values, said iteration to continue until the third data value is similar to the first data value,
      e. means to generate fourth data values relating to xenon and boron concentration in accordance with the third data value; and
   indicating means to represent reactor operation at the end of said lapsed time in accordance with the fourth data values.

6. An automated simulator according to claim 5 wherein the fourth data values generated for the first lapsed time are employed to iteratively generate a data value relating to a reactor critical bias factor corresponding to a second lapsed time.

7. An automated training simulator according to claim 6 wherein the data values are generated in a programmed digital computer.

8. An automated training simulator according to claim 5 where the first and second lapsed times each are representative of approximately 5 hours.

9. An automated training simulator according to claim 5 wherein the calculating means is structured in a programmed digital computer means.

10. An automated training simulator for the real-time dynamic operation of a nuclear reactor in which the power output of the reactor is influenced by xenon; said simulator comprising
   command means operable to generate input data representative of selected lapsed time increments for reactor xenon effect;
   calculating means including sequence controlling means having the following components
      a. means to store a first plurality of data values relating to average decay heat build-up factor, fission power and decay heat,
      b. means to store a second plurality of data values relating to nuclear flux, xenon, and nuclear fission cross-section,
      c. means to store a third plurality of data values relating to unestimated rate of nuclear flux and nuclear fission cross-section change for a first representative time increment,
      d. means to store a fourth plurality of data values relating to estimated boron concentration and a critical bias factor,
      e. means to generate a data value relating to xenon concentration in accordance with the second and fourth plurality of stored data values,
      f. means to generate a data value relating to boron concentration and a critical bias, said data values being representative of boron and a critical bias at the end of the first representative time increment,
      g. means to generate a data value relating to nuclear flux in accordance with the generated critical bias factor data value,
      h. means to generate a data value relating to xenon concentration in accordance with the generated data value relating to nuclear flux, i. means to generate a data value relating to decay heat in accordance with the first plurality of data values,
j. means to store each generated data value,
k. means to generate new data values relating to each of the stored generated data values a predetermined number of times, said predetermined number of times corresponding to the selected number of lapsed time increments; and indicating devices governed by the last generated data values to represent reactor operation at the end of the selected time increments.

11. An automated simulator according to claim 10 wherein the decay heat data value is iteratively generated in accordance with the convergence of data values relating to fission power and estimated fission power.

12. An automated training simulator according to claim 11 wherein the data values are generated in a programmed digital computer.

13. An automated simulator according to claim 10 wherein the generation of the xenon data value includes the integration of xenon data values in accordance with the generated rate of change for each time increment.

14. An automated training simulator according to claim 13 wherein the data values are generated in a programmed digital computer.

15. An automated training simulator according to claim 10 wherein the calculating means is structured in a programmed digital computer means.

* * * * *